(12) United States Patent
Tomisaka et al.

(10) Patent No.: US 11,963,485 B2
(45) Date of Patent: Apr. 23, 2024

(54) NATURAL INVASION PROMOTING METHOD AND SPRAYING MATERIAL

(71) Applicants: NIPPON KOEI CO., LTD., Tokyo (JP); NIKKEN SOHONSHA CORPORATION, Hashima (JP)

(72) Inventors: Mineto Tomisaka, Naha (JP); Masaru Onodera, Kashiwa (JP); Fumiko Iwaki, Arakawa (JP); Hisako Sanada, Ushiku (JP); Taketo Nakano, Higashihiroshima (JP); Nobuo Mori, Hashima (JP); Ryo Sumi, Gifu (JP); Kanya Tokunaga, Hashima-gun (JP)

(73) Assignees: NIPPON KOEI CO., LTD., Tokyo (JP); NIKKEN SOHONSHA CORPORATION, Hashima (JP)

( * ) Notice: Subject to any disclaimer, the term of this patent is extended or adjusted under 35 U.S.C. 154(b) by 363 days.

(21) Appl. No.: 17/312,440

(22) PCT Filed: Aug. 14, 2019

(86) PCT No.: PCT/JP2019/031964
§ 371 (c)(1),
(2) Date: Jun. 10, 2021

(87) PCT Pub. No.: WO2020/202595
PCT Pub. Date: Oct. 8, 2020

(65) Prior Publication Data
US 2022/0046868 A1   Feb. 17, 2022

(30) Foreign Application Priority Data
Mar. 29, 2019 (JP) ................. 2019-067648

(51) Int. Cl.
*A01G 20/00* (2018.01)
*A01G 33/00* (2006.01)
(Continued)

(52) U.S. Cl.
CPC .............. *A01G 20/00* (2018.02); *A01G 33/00* (2013.01); *A01G 24/22* (2018.02); *E02D 17/20* (2013.01)

(58) Field of Classification Search
CPC ................................ A01G 20/22; A01G 33/00
See application file for complete search history.

(56) References Cited

U.S. PATENT DOCUMENTS 3,969,844 A * 7/1976 Fogel ..................... A01G 33/00
                                                        435/946
4,774,186 A * 9/1988 Schaefer, Jr. ........... C05F 11/08
                                                        435/946
(Continued)

FOREIGN PATENT DOCUMENTS

CN     102173922 A     9/2011
CN     107118018 A     9/2017
(Continued)

OTHER PUBLICATIONS

Oct. 29, 2019 International Search Report issued in International Patent Application No. PCT/JP2019/031964.
(Continued)

*Primary Examiner* — Jessica B Wong
(74) *Attorney, Agent, or Firm* — Oliff PLC (57) ABSTRACT

A natural invasion promoting method that is environmentally friendly, easy to carry out, can cope with a wide range of areas and inclined surfaces, achieves efficient natural invasion, and can satisfactorily promote greening on a soil surface of interest, and a spraying material used in the method are provided. A natural invasion promoting method including: spraying a spraying material containing live algae on a soil surface; breeding the live algae; and also directly or indirectly catching flying seeds or spores by a tacky substance secreted on surfaces of the live algae or a catching (Continued)

structure composed of the live algae to promote greening on the soil surface.

6 Claims, 1 Drawing Sheet

(51) Int. Cl.
  *A01G 24/22* (2018.01)
  *E02D 17/20* (2006.01)

(56) References Cited

U.S. PATENT DOCUMENTS

| | | | |
|---|---|---|---|
| 6,228,136 B1 * | 5/2001 | Riley | ............ B09C 1/10 |
| | | | 435/170 |
| 8,105,646 B2 * | 1/2012 | Dody | ............ A01C 21/00 |
| | | | 47/58.1 SC |

FOREIGN PATENT DOCUMENTS

| | | |
|---|---|---|
| JP | 2004-257084 A | 9/2004 |
| JP | 2004-360206 A | 12/2004 |
| JP | 2006-20553 A | 1/2006 |
| JP | 2010-259331 A | 11/2010 |
| JP | 2016-3495 A | 1/2016 |
| JP | 2016-196769 A | 11/2016 |
| JP | 2018-184833 A | 11/2018 |
| JP | 2018-193743 A | 12/2018 |
| KR | 10-1289907 B1 | 7/2013 |

OTHER PUBLICATIONS

Apr. 16, 2020 Office Action issued in Japanese Patent Application No. 2020-505509.
Oct. 29, 2019 Translation of Written Opinion issued in International Patent Application No. PCT/JP2019/031964.
May 6, 2022 Office Action issued in Chinese Patent Application No. 201980082125.4.
Oct. 26, 2022 Office Action issued in Chinese Patent Application No. 201980082125.4.
Feb. 11, 2023 Office Action issued in Taiwanese Patent Application No. 108129274.
Nov. 8, 2022 Extended Search Report issued in European Patent Application No. 19923244.8.
Mar. 3, 2022 Office Action issued in Brazilian Patent Application No. 112021018889-4.
Jun. 7, 2022 Office Action issued in Brazilian Patent Application No. 112021018889-4.
Mar. 2, 2023 Written Opinion issued in Brazilian Patent Application No. 112021018889-4.

* cited by examiner

NATURAL INVASION PROMOTING METHOD AND SPRAYING MATERIAL

TECHNICAL FIELD

The present invention relates to a natural invasion promoting method and a spraying material used in the natural invasion promoting method. More specifically, the present invention relates to a method for catching and germinating seeds, spores, and the like which have flown onto a soil surface, and a spraying material used in the method.

BACKGROUND ART

Bare land caused by natural disasters or construction work, or soil surface with devastated vegetation (hereinafter, also referred to as bare land or the like) has a problem of spoiling the landscape. In particular, there is a demand for prompt greening of bare land in areas where many people gather such as in parks, residential areas, and cities.

In response to the above demand for greening, for example, Patent Literature 1 below proposes a greening method (hereinafter, also referred to as Prior Art 1) in which a greening material is sprayed on a slope from a spray nozzle. Examples of the greening material include seeds such as exotic plants or woods, organic soil conditioners such as bark compost or peat moss, chemical fertilizers, and polymer-based erosion inhibitors such as re-emulsifying resin powder. That is, Prior Art 1 relates to a technique of spraying seeds of an exotic species on a slope together with a fertilizer or the like to germinate and grow the seeds for greening.

Further, Patent Literature 2 below proposes a greening method (hereinafter, also referred to as Prior Art 2) in which a growth base in which seeds are mixed and a growth base not containing seeds are sprayed in a non-planar manner on a greening construction surface such as a slope or an inclined surface. In Prior Art 2, the growth base in which seeds are not mixed is sprayed so as to be thinner than the growth base in which seeds are mixed, so that the growth base in which seeds are mixed is formed in a convex shape, and the growth base in which seeds are not mixed is formed in a concave shape. Then, Prior Art 2 aims to fix the seeds flying from the periphery of the greening construction surface on the growth base formed in the concave shape. That is, Prior Art 2 aims to artificially form a structure (that is, a concave growth base) in which plants can easily invade naturally from the periphery of the greening construction surface.

Further, Patent Literature 3 below discloses a flying seed catching structure (hereinafter, also referred to as Prior Art 3) including a net which is a sheet-like body arranged on a slope and a washer for bringing the net into close contact with the slope.

Specifically, the net has a bag-shaped portion connected in a direction substantially aligned with the contour lines of the slope. A seed catching portion formed by making a net mesh dense is provided on a valley side portion of the bag shape. On the other hand, the washer is a washer with a spacer function, which includes a holding portion for bringing the net into close contact with the slope and a sheet support portion serving as a spacer for holding the bag-shaped portion at a predetermined height.

In Prior Art 3, the seed catching portion is supported from below by the sheet support portion, so that the seed catching portion is held at a position higher than the slope. As a result, Prior Art 3 makes it possible to make the seed catching portion float from the slope and easily catch the seed.

CITATION LIST

Patent Literature

Patent Literature 1: JP 2018-193743 A
Patent Literature 2: JP 2010-259331 A
Patent Literature 3: JP 2016-3495 A

SUMMARY OF INVENTION

Technical Problem

However, the conventional greening methods represented by Prior Arts 1 to 3 have the following problems.

Specifically, many spraying methods of spraying seeds on a slope as in Prior Art 1 use non-biodegradable chemical materials, which may have an undesired effect on the environment. In addition, the seeds sprayed by the spraying method are generally exotic species in many cases. Therefore, the surrounding vegetation may be destroyed by exotic plants. For example, in an area such as a national park where sufficient consideration is required for the environment, it is desirable to maintain the original natural environment of the area. Therefore, greening by exotic plants may not be appropriate.

On the other hand, there is no problem as described above in the case of catching seeds flying from the surroundings and growing them for greening as in Prior Arts 2 and 3. However, Prior Art 2 may have the same problems as Prior Art 1 in that it uses a growth base in which seeds are mixed. Further, in Prior Art 2, it is necessary to alternately spray the growth base in which seeds are mixed and the growth base not containing seeds in a non-planar manner, which requires a large amount of construction labor. Therefore, Prior Art 2 is unsuitable for implementation in a wide area and implementation on an inclined surface.

Further, in Prior Art 3, in order to arrange the sheet on the slope, it is necessary to shape the slope flat in advance, which requires a large amount of construction labor. Therefore, Prior Art 3 as well as Prior Art 2 is unsuitable for implementation in a wide area and implementation on an inclined surface. Further, in Prior Art 3, the sheet is arranged on the slope, and thus the environment may be affected, and, besides, the part where the flying seeds can be caught is limited, so that efficient natural invasion cannot be expected.

Further, in Prior Arts 2 and 3, the flying seeds may flow out due to rainfall or the like, and there are problems that natural invasion is not performed promptly, and that the amount of natural invasion is small.

The present invention has been made in view of the above problems. That is, the present invention provides a natural invasion promoting method that is environmentally friendly, easy to carry out, can cope with a wide range of areas and slopes, achieves efficient natural invasion, and can satisfactorily promote greening on a soil surface of interest, and a spraying material used in the method are provided.

Solution to Problem

The natural invasion promoting method of the present invention includes: spraying a spraying material including live algae on a soil surface; breeding the live algae; and also directly or indirectly catching flying seeds or spores by a tacky substance secreted on surfaces of the live algae or a catching structure composed of the live algae to promote greening on the soil surface.

The spraying material of the present invention is a spraying material that is used in the natural invasion promoting method of the present invention, the spraying material including live algae.

Advantageous Effects of Invention

In the present invention, greening is achieved by naturally flying seeds or the like, and thus sufficient consideration can be given to the environment of the construction site. Further, the natural invasion promoting method of the present invention is easy to carry out because it is not necessary to arrange a sheet or the like for catching seeds or the like. Therefore, the natural invasion promoting method of the present invention can sufficiently cope with a wide area or an inclined surface. Further, in the present invention, live algae are sprayed and bred on the soil surface, so that seeds or the like can be more efficiently caught by a tacky substance secreted from the live algae or a catching structure composed of the live algae.

DESCRIPTION OF EMBODIMENTS

[Natural Invasion Promoting Method]

In the natural invasion promoting method of the present invention (hereinafter, may be simply referred to as the present method), a spraying material containing live algae is sprayed on a soil surface. The live algae are bred on the soil surface, and also flying seeds or spores are directly or indirectly caught by a tacky substance secreted on surfaces of the bred live algae or a catching structure composed of the live algae. As a result, the natural invasion promoting method of the present invention promotes greening on the soil surface. The "seeds or spores" may be simply referred to as "seeds or the like" in the following description.

In the present invention, the seeds refers to seeds of a seed plant, and the spores refers to germ cells formed by algae, fungi, fern plants, moss plants, protists, or the like.

In the present invention, the natural invasion means that seeds or the like that have flown onto the soil surface are caught and germinated on the soil surface. The present invention ensures natural invasion, thereby significantly promoting greening of the soil surface. In the present invention, the germination described above includes not only seed germination but also spore germination and breeding.

Further, in the present invention, the live algae refer to algae that have not died. More specifically, the live algae means algae that can grow on the soil surface and algae that have grown on the soil surface after being sprayed on the soil surface. The live algae are distinguished from the killed algae product obtained by killing treatment, which will be described below.

More specifically, in the present method, at least live algae are sprayed on the soil surface, and the live algae are germinated and bred. On the soil surface, the live algae can secrete a tacky substance on a surface of the algae body or form a catching structure.

In the present invention, the catching structure refers to a three-dimensional structure composed of live algae that can catch flying seeds or branches or leaves.

More specifically, examples of the catching structure include a network structure and an uneven structure. The network structure described above refers to a reticulated three-dimensional mesh structure formed by entwining live algae grown in a filamentous shape or the like. The uneven structure described above refers to a structure in which live algae grown regardless of shape are randomly overlapped with each other.

When seeds or the like fly onto the soil surface where such live algae have bred, the seeds or the like are firmly caught by the tacky substance or the catching structure such as the network structure or uneven structure described above. Seeds or the like that have flown into mere bare land or the like, flow out due to wind and rain, and do not take root in the soil that is the bare land, in many cases. On the other hand, in the present method, seeds or the like are firmly caught by live algae, as described above, and thus the germination rate is high and greening is promoted satisfactorily.

In the present invention, the fact that the flying seeds or the like are directly caught by the live algae means that the seeds or the like are directly fixed to the tacky substance of the live algae or physically caught by the catching structure of the live algae. On the other hand, in the present invention, the fact that the flying seeds or the like are indirectly caught by the live algae means that flying objects, such as branches and leaves, that have fallen onto the tacky substance of the live algae or the catching structure of the live algae are caught thereby and then that seeds or the like that have flown subsequently are caught by the flying object.

Since the present method uses live algae as a base for catching seeds or the like, it does not pollute the environment.

In addition, the present method does not require the work of installing artificial objects, such as sheets and resins, that are difficult to decompose in nature, and is easy to carry out. Therefore, the present method can sufficiently cope with a wide range of soil surfaces and inclined surfaces. In addition, in the present method, flying seeds or the like are directly or indirectly caught by live algae. Therefore, it is possible to prevent the flying seeds or the like from flowing out due to wind and rain, and to secure a large amount of natural invasion.

In addition, according to the present method, the sprayed live algae breed on the soil surface, and thus the soil surface is easily maintained at an appropriate humidity. Therefore, the soil surface can maintain an environment where flying and caught seeds or the like can germinate and grow easily.

The present method will be described in more detail below.

(Live Algae)

The live algae used in the present method include one kind of algae selected from the group consisting of unicellular algae, colonial algae, filamentous or branch algae, polynuclear tubular algae, polynuclear saccular algae, phylloid algae, and the like and combinations thereof. These six groups are known groups that are discriminated primarily based on the morphological characteristics of algae, not based on biological classification. Many algae have been confirmed to breed all over the world, and are unlikely to affect the vegetation and environment of the construction site where the present method is implemented. In particular, the use of algae that breed in the construction site is preferable because of its high suitability for the vegetation and environment of the construction site. In addition, algae generally have better initial growth after spraying than moss, and natural invasion can be promoted promptly after implementation of the present method.

The unicellular algae are mono-granular algae in their morphology, but are a group of algae characterized by forming a cell aggregate as they grow.

The colonial algae (including coenobia) are a group of algae in which cells are gathered without any interrelationship or with some interrelationship. The colonial algae are a group having a characteristic of mutually gathering to form an aggregate as they grow.

The filamentous algae or the branch algae are a group of algae having a characteristic that filamentous or branched algae are intertwined with each other and develop into tufts or nets as they grow.

The polynuclear tubular algae are algae in which a large number of nuclei are dispersed in tubular cells as they grow.

The polynuclear saccular algae are algae in which a large number of nuclei are dispersed in saccular cells as they grow.

Phylloid algae are a group of algae that have a characteristic of spreading in the form of leaves, like marine Monostroma nitidum, as they grow.

Since unicellular algae have an earlier growth start time and a vigorous proliferative capacity than filamentous algae or branch algae, natural invasion can be started earlier. Unicellular algae can function as the uneven structure in the present invention because a large number of cells gather by breeding.

Filamentous algae or branch algae tend to have a slightly inferior initial proliferative capacity as compared with unicellular algae, but, when they sufficiently grow near the soil surface, the filamentous bodies tend to form a network structure.

In addition, for colonial algae, the above-described aggregate formed by breeding can function as the uneven structure in the present invention. Similarly, phylloid algae also breed in the form of leaves, and thus are easy to form the uneven structure in the present invention.

Further, polynuclear tubular algae can function as the network structure in the present invention because the tubular bodies easily form a network structure when they sufficiently grow near the soil surface.

Polynuclear saccular algae can function as the uneven structure in the present invention because the aggregation of saccular bodies easily forms an uneven structure whey they sufficiently grow near the soil surface.

The live algae in the present invention include blue-green algae (class Cyanophyceae), red algae (class Rhodophyceae), brown flagellate algae (class Cryptophyceae), dinoflagellates (class Dinophyceae), yellow flagellate algae (class Chrysophyceae), yellow-green algae (class Xanthophyceae), diatoms (class Bacillariophyceae), eustigmatophytes (class Eustigmatophyceae), euglenoids (class Euglenophyceae), and green algae (class Chlorophyceae), in terms of biological classification. The above-described live algae can be appropriately selected from algae that can grow on the surface layer of soil and the like. In the present invention, cyanobacteria (eubacteria) are treated as cyanobacteria (particularly, blue-green algae (Cyanophyceae)) based on the conventional (old classification system) taxonomy.

The classification of algae in the present specification is mainly based on the description of "Freshwater algae" (written by Takaaki Yamagishi; 2007, published by Uchida Rokakuho Publishing Co., Ltd.).

For example, examples of the class Cyanophyceae (Cyanobacteria) can include the families Chroococcaceae, Entophysalidaceae, Tubiellaceae, Stigonemataceae, Capsosiraceae, Borzinemataceae, Mastigocladaceae, Mastigocladopsidaceae, Nostochopsidaceae, Scytonemataceae, Microchaetaceae, Rivulariaceae, Nostocaceae and Oscillatoriaceae.

Examples of the class Rhodophyceae can include the families Porphyridiaceae, Cyanidiaceae, and Phragmonemataceae.

Examples of the class Cryptophyceae can include the family Tetragonidiaceae.

Examples of the Dinophyceae can include the families Phytodiniaceae and Gloeodiniaceae.

Examples of the class Chrysophyceae can include the families Chrysocapsaceae, and Phaeothamniaceae.

Examples of the class Xanthophyceae can include the families Pleurochloridaceae, Sciadiaceae, Characiopsidaceae, Chlorobotorydaceae, Tribonemataceae, Botrydiaceae, and Vaucheriaceae.

Examples of the class Bacillariophyceae can include the families Coscinodiscaceae, Diatomaceae, Eunotiaceae, Achnanthaceae, Naviculaceae, Epithemiaceae, Nitzchiaceae, and Surirellaceae.

Examples of the class Eustigmatophyceae can include the families Eustigmataceae, Pseudocharaciopsidaceae, Chlorobotrydaceae, and Monodopsidaceae.

Examples of the class Euglenophyceae can include the family Euglenaceae.

Examples of the class Chlorophyceae can include the families Pedinomonadaceae, Chlamydomonadaceae, Volvocaceae, Gloeococcaceae, Chlorococcaceae, Charakiochloridaceae, Actinochloridaceae, Gloeodendraceae, Characiosiphonaceae, Myrmeciaceae, Palmellaceae, Chlorochytraceae, Characiaceae, Treubariaceae, Chlorellaceae, Botryococcaceae, Radiococcaceae, Oocystaceae, Coelastraceae, Scenedesumaceae, Neochloridaceae, Protosiphonaceae, Chlorosarcinaceae, Gloeotilaceae, Microsporaceae, Prasiolaceae, Chaetophoraceae, Oedogoniaceae, Ulotrichaceae, Pleurastraceae, Trentepohliaceae, Chlorokybaceae, Klebsormidiaceae, Mesotaeniaceae, Desmidiaceae, and Zygnemataceae.

As the live algae used in the present invention, it is preferable to use algae classified into the class Chlorophyceae from the viewpoint of satisfactorily secreting tacky substances. Among them, one kind selected from the group consisting of the genus Pseudokirchneriella of the family Oocystaceae, the genus Desmididium of the family Desmidiaceae, the genus Cylindrocystis and the like, or a combination thereof remarkably secretes tacky substances, and thus is more preferable. In the present invention, the "tacky substance" refers to a substance having tackiness sufficient to directly or indirectly fix seeds or the like onto live algae, and refers to all substances produced and secreted from the live algae.

Further, as the live algae used in the present invention, it is preferable to use algae classified into the class Chlorophyceae from the viewpoint of satisfactorily forming a network structure. Among them, one kind selected from the group consisting of the genus Klebsormidium of the family Ulotrichaceae, the genus *Trentepohlia* of the family Trentepohliaceae, the genus Spongioplastidium of the family Chaetophoraceae and the like, or a combination thereof is preferable because it is in the form of filamentous bodies, which easily form a network structure as breeding while being intertwined with each other.

Further, as the live algae used in the present invention, it is preferable to use algae classified into the class Xanthophyceae from the viewpoint of satisfactorily forming an uneven structure. Among them, one kind selected from the group consisting of the genus Botoridium of the family Botrydiaceae, the genus Vaucheria of the family Vaucheriaceae and the like, or a combination thereof, is preferable because it forms thick tubular cell bodies or oogonia on the soil surface, or a large balloon-like saccular bodies and breeds, and thus easily forms an uneven structure.

As the live algae used in the present invention, particularly, the genus Klebsormidium of the family Ulotrichaceae, which is classified as the class Chlorophyceae, is preferable as the live algae of the present invention because the filamentous bodies intricately grow and exhibit a network structure.

The live algae used in the present invention may be one kind of algae or a combination of two or more kinds of algae. When two or more kinds of algae are used in combination as the live algae, for example, a combination of two or more kinds of algae selected from the group consisting of algae that easily secrete tacky substances, algae that easily form a network structure, and algae that easily form an uneven structure is preferable.

The method for preparing the live algae is not particularly limited, and an appropriate method can be adopted as long as the live algae can be sprayed, in a non-dead state, on the soil surface where the present method is carried out.

The live algae can be obtained, for example, by collecting algae breeding in any soil, culturing them in a medium suitable for the desired class of algae, separating the desired class of algae, and mass-culturing the separated algae. It is preferable to select an area where the present method is planned to be carried out or its surrounding area as the algae collection site. This is because changes in the natural environment can be minimized. That is, algae breeding in the area where the present method is planned to be carried out or its surrounding area are one of preferred embodiment as the live algae in the present method. Further, the selection of an arbitrary area of a country to which the area where the present method is planned to be carried out belongs as the algae collection site is preferable as making it possible to prevent the contamination of an exotic species of algae.

Instead of collecting algae to prepare the live algae, commercially available algae may be used as the live algae.

The live algae used in the present invention are cultivated and collected by a method appropriately selected from known algae culturing methods.

For example, in order to separate algae at the taxonomic "class" level, it is advisable to select a medium having a composition suitable for algae of interest as the medium used for culturing the algae. However, the algae used in the present invention do not necessarily have to be completely purified into one kind. Therefore, when mass-culturing algae, a medium for mass culturing that can be generally used for algae may be used.

In the present method, the method of spraying the spraying material containing the live algae on the soil surface is not particularly limited.

The cultured algae can be prepared by methods exemplified in i) to iii) as follows and sprayed on the soil surface as the live algae.

i) Mass-cultured algae may be prepared into a paste by being concentrated in a solid-liquid separator such as a large-sized centrifuge or filtration device and appropriately removing water. The paste-like algae are transported to a construction site, for example, and are sprayed, in an appropriately diluted state, on the soil surface as the live algae.

ii) Mass-cultured algae may be prepared into powder by being concentrated in a solid-liquid separator such as a large-sized centrifuge or filtration device, dried at a low temperature, and pulverized. The means for carrying out the low-temperature drying referred to herein is not particularly limited, and examples thereof include sun drying and drying by blower at 60° C. or lower. The powdered live algae may be sprayed on the soil surface in a dry state by a power sprayer or the like, or may be sprayed on the soil surface in the form of a suspended matter suspended in a liquid such as water.

iii) The powdered live algae prepared according to ii) above may be formulated into granules by being coated with a coating agent having water permeability, breathability and water retention. Examples of the coating agent include gelatin, and various polysaccharides. The granularly-formulated live algae are easy to spray and have good adhesion to the soil surface depending on the properties of the coating agent. The coating agent can be a nutrient for the live algae. The formulation includes microencapsulation.

In the present method, the spraying material containing the live algae may be a spraying material containing substantially only the live algae, or a spraying material containing any other material in addition to the live algae.

Further, the above-described spraying material may be one kind of spraying material prepared by suspending or mixing all the materials when one or more other materials (components) are contained in addition to the live algae. In this case, all the materials are sprayed on the soil surface at substantially the same time.

When the spraying material contains one or more other materials (components) in addition to the live algae, at least one of these materials may be treated independently of the other one. Two or more materials that are treated independently may be sprayed at substantially the same time, or the spraying steps may be mutually carried out in succession. In the present method, for example, when live algae, component A, and component B are contained in the spraying material, the suspended matters of the live algae and component A may be sprayed on the soil surface in the first spraying step, and then the component B may be sprayed on the soil surface in the second spraying step. Further, in the present method, the live algae, the component A, and the component B may be sprayed in any order.

The amount of the live algae sprayed on the soil surface is not particularly limited, and can be appropriately determined in consideration of the environment around the soil surface on which the present method is carried out, the season and temperature at the time of construction, and the like.

In the present method, the amount of the live algae sprayed is preferably 30 g/m² or less, and more preferably 25 g/m² or less. Within such a range, the flying seeds or the like can be satisfactorily caught directly or indirectly without any economic disadvantage.

On the other hand, the amount of live algae sprayed is 1 g/m² or more, more preferably 2 g/m² or more, further preferably 4 g/m² or more, from the viewpoint of realizing a state in which flying seeds or the like can be caught satisfactorily in a short period of time (for example, about several weeks) after implementation of this step.

The amount of the live algae sprayed referred to herein indicates the dry mass of the live algae.

(Killed Algae Product)

In the present method, it is preferable to spray a killed algae product in addition to the above-described live algae. That is, the spraying material used in the present invention may contain a killed algae product made of killed algae.

By spraying the killed algae product together with the live algae in the present method, the initial growth of the live algae can be satisfactorily promoted. As a result, it is possible to significantly increase the amount of flying seeds or the like caught and promote greening, in a short period of time (for example, about 1 to 2 weeks) after implementation of the present method.

The killed algae product made of killed algae in the present invention means a treated product composed of algae that has been killed by any means such as heat treatment. Here, the killed algae refers to algae that cannot grow on a soil surface even if sprayed on the soil surface and can be decomposed by soil microorganisms or the like or their decomposition products.

The algae used for preparing the killed algae product can be appropriately selected from those exemplified as the algae used for the preparation of the live algae described above and seaweeds. Examples of seaweeds include brown algae such as wakame seaweed, kelp, or hijiki seaweed, red algae such as Porphyra tenera or Gelidium amansii, and green algae such as sea lettuce or green laver.

The algae used in the killed algae product may be one kind of algae or a combination of two or more kinds of algae. The algae used as the live algae and the algae used for the killed algae product may be the same or different.

The killed algae product preferably contains a protein. When a high-protein killed algae product is sprayed together with the live algae, the initial growth of the live algae tends to be satisfactorily promoted. In addition, the protein contained in the killed algae product also contributes to the growth of soil microorganisms, and, as a result, enriches the soil and may have a favorable effect on the germination and growth of the caught seeds or the like.

For this reason, the algae used to prepare the killed algae product more preferably contain 40% by mass or more, further preferably 50% by mass or more, particularly preferably 55% by mass or more of a protein. The killed algae product prepared using high-protein algae may contain a protein equal to or higher than that of the high protein algae.

Examples of the high-protein algae can include, but are not limited to, the genus *Spirulina* belonging to the class Cyanophyceae, the genus *Chlorella* belonging to the class Chlorophyceae, and seaweed.

As a protein source derived from natural products other than algae, for example, fish meal is known. However, fish meal has a high oil content and may contain heavy metals. Therefore, when fish meal is sprayed on the soil surface, it may not be preferable in terms of environmental conservation. On the other hand, the killed algae product has a good effect on the growth of algae, can increase the activities of various soil microorganisms in a well-balanced manner, and has no problem in terms of environmental conservation.

Further, the killed algae product preferably contains a protein and at least one selected from the group consisting of carbohydrate, lipid and ash (hereinafter, also referred to as carbohydrate and the like). Above all, it is more preferable to contain at least one of carbohydrate and ash. This can further promote the initial growth of the live algae sprayed on the soil, and can also have a desirable effect on the growth of the caught seeds or the like. It is preferable that all of the above-described carbohydrates and the like be derived from algae. The ash content also refers to a nonflammable mineral substance, for example, any one selected from the group consisting of calcium, iron, sodium, and minerals, or a combination of two or more thereof.

Examples of algae containing a protein and further at least one of carbohydrate and the like include, but are not limited to, the genus *Spirulina* belonging to the class Cyanophyceae, the genus *Chlorella* belonging to the class Chlorophyceae, and seaweed.

The method for obtaining a killed algae product containing at least a protein is not particularly limited. For example, it is possible to kill algae while leaving effective components by heat-treating algae containing at least a protein at a moderately low temperature. Here, the moderately low temperature is, for example, preferably 60° C. or higher and 200° C. or lower, more preferably 80° C. or higher and 180° C. or lower, further preferably 100° C. or higher and 120° C. or lower. If the heat treatment temperature is below 60° C., the algae may not be completely killed. If the heat treatment temperature exceeds 200° C., the protein or carbohydrate or the like may be partially or wholly decomposed thermally and disappear.

Examples of the method for preparing the killed algae product include the following examples.

(Killing Method 1)

*Chlorella* raw powder is prepared from green algae, and this is subjected to hot water extraction treatment to separate it into *chlorella* extract and *chlorella* extract extraction residue. Then, the *chlorella* extract extraction residue is dried in a heat convection dryer set to a temperature in the range of 280° C. or higher and 350° C. or lower, for example, and pulverized so that a pulverized killed algae product can be obtained.

(Killing Method 2)

The cultured algae are separated into solid and liquid by a centrifuge, and the concentrated culture is washed with water. The solid-liquid separation and the water washing are repeated to obtain a separated product from which the medium components have been removed. Then, the separated product is heat-treated with a spray dryer or a drum dryer or the like to kill the algae and pulverize it. As a result, a powdered killed algae product can be obtained. The treatment temperature in the heat treatment is not particularly limited, but is preferably in the range of 60° C. or higher and 200° C. or lower.

(Killing Method 3)

The cultured algae are crushed by sonication or a homogenizer or the like, and then washed with water to filter the water. The above-described crushing treatment, washing with water, and filtration are repeated to obtain a treated product from which the medium components have been removed. The killed algae product can be obtained by heat-treating the treated product in the same manner as in the above-described killing method 2.

(Tackifier)

The spraying material used in this step may further contain a tackifier. By spraying the tackifier together with the live algae, it is possible to prevent the live algae before growing from flowing out from the soil surface due to the influence of wind and rain after the spraying.

In addition, it is possible to catch seeds or the like with the tackifier even in the period before the sprayed live algae are in a state of successfully catching the seeds or the like. In addition, the tackifier can fix the grown live algae to each other onto the soil surface, or fix the grown live algae to the twigs, fallen leaves, etc., and can complicate the soil surface. As a result, the seeds or the like are easily physically caught on the soil surface. Further, the tackifier can be well involved in the catching of the seeds or the like even after the sprayed live algae secrete the tacky substance or form a catching structure such as a network structure or an uneven structure.

Examples of the tackifier include high molecular polymers such as polyglutamic acid, gelatin, and agar. From the viewpoint of easy handling, it is preferable that the tackifier be not tacky or has a weak tackiness in a dry state, and significantly exhibit tackiness in a water-containing state. Further, from the viewpoint of environmental conservation, the tackifier is preferably biodegradable.

Among them, polyglutamic acid is preferable as the tackifier. Polyglutamic acid fully serves as the tackifier for a certain period of time after spraying, and can be decomposed by soil microorganisms by the time live algae grow on the soil surface. The decomposed polyglutamic acid contributes to the growth of the seeds or the like because it assists the absorption of nutrients from the roots of the seeds or the like caught by the live algae.

The polyglutamic acid may be a naturally occurring γ-polyglutamic acid or an artificially synthesized polyglutamic acid. The polyglutamic acid may be commercially available.

(Fiber Material)

The spraying material used in the present method may include a fiber material. The fiber material is contained in the spraying material, thereby preventing the live algae and the like to flow out when the spraying material is affected by wind and rain in a short period of time after spraying of the spraying material.

Further, when the spraying material contains a fiber material and a tackifier such as polyglutamic acid, the tackifier can bind the fiber materials to each other to form a three-dimensional structure. The three-dimensional structure of fiber materials more effectively prevents the outflow of the live algae and the like from the soil surface and helps to catch the seeds or the like.

The fiber material may be any material that contains fibrous and can be sprayed on the soil surface. For example, as commercially available products, coating protective materials for spray sowing containing pulp as a main raw material are known, which are gradually decomposed by soil bacteria or the like in the natural environment. Specific examples of commercially available products include, but are not limited to, Oji Fiber (registered trademark) manufactured by Tomakomai Oji Paper Co., Ltd.

(Fertilizer)

The spraying material used in the present method may further contain a fertilizer from the viewpoint of promoting the growth of the caught seeds or the like or the growth of the live algae.

Examples of the fertilizer include any one or more of organic fertilizers made from organic substances, inorganic fertilizers made from inorganic substances, and chemically synthesized chemical fertilizers. Among them, chemical fertilizers produced by mixing raw materials for chemical fertilizers and simple fertilizers and subjecting them to chemical treatment are preferable as fertilizers contained in the spraying material. The chemical fertilizer preferably contains two or more of components selected from nitrogen, phosphoric acid, magnesium oxide (magnesia) and potassium, and more preferably contains, particularly, magnesium oxide and one or more of other components. This is because magnesium oxide can promote the growth of the live algae.

Examples of commercially available chemical fertilizers include, but are not limited to, Green Hosca (registered trademark) (fine grain) and Birdie Ace (registered trademark) No. 1 (fine grain) manufactured by JCAM Agri Co., Ltd. Green Hosca (fine grain) contains a slow-acting fertilizer (manufactured by JCAM Agri Co., Ltd., product name: CDU), fast-acting nitrogen, potassium and magnesia. Birdie Ace No. 1 (fine grain) contains magnesia and a slow-acting fertilizer (manufactured by JCAM Agri Co., Ltd., product name: IB).

[Spraying Material]

The spraying material of the present invention will be described below. The spraying material of the present invention is used in the above-described natural invasion promoting method. The spraying material contains at least live algae.

The spraying material preferably contains, in addition to the live algae, any one or more selected from the group consisting of killed algae products, tackifiers such as polyglutamic acid, fertilizers, and fiber materials. Among them, the spraying material more preferably contains a killed algae product and a tackifier in addition to the live algae, and particularly preferably contains all of a killed algae product, a tackifier such as polyglutamic acid, a fertilizer, and a fiber material.

For the live algae, the killed algae product, the tackifier, the fertilizer, and the fiber material contained in the spraying material of the present invention, the above explanations regarding the natural invasion promoting method are referred to, so detailed explanations are spared here.

The spraying material of the present invention may be a mixture of the live algae and any other component. The mixture may be sprayed in a dry state, or may be previously suspended in a liquid such as water to prepare a semi fluid and sprayed in that state.

The spraying material of the present invention may also be a set in which the live algae and any other component are individually managed. The components constituting the set may be sequentially sprayed, or may be mixed at the construction site and sprayed at the same time.

The spraying material of the present invention is excellent in handleability and transportability, and spraying work on the soil surface is also easy. By spraying the spraying material of the present invention on the soil surface, effects similar to those obtained by carrying out the above-described natural invasion promoting method can be obtained.

The mass ratio of the killed algae product to the live algae is preferably in the range of the mass (g) of the live algae: the mass (g) of the killed algae product=100:0 to 50:50, more preferably in the range of the mass (g) of the live algae: the mass (g) of the killed algae product=90:10 to 70:30.

The mass ratio of the tackifier to the live algae is preferably in the range of the mass (g) of the live algae: the mass (g) of the tackifier=100:0 to 10:90, more preferably in the range of the mass (g) of the live algae: the mass (g) of the tackifier=70:30 to 20:80, further preferably in the range of the mass (g) of the live algae: the mass (g) of the tackifier=50:50 to 30:70.

None of the above-described mass ratios are limited to the present invention. The mass ratios can be appropriately determined in consideration of the environment or season in which the spraying material is sprayed, or the type or content of any other material contained in the spraying material.

All the mass ratios indicating the above numerical ranges are mass ratios based on the dry mass.

EXAMPLES

The spraying materials used in the Examples and the Comparative Example were prepared with the following contents.

Example 1

Dry live algae powder (the genus Klebsormidium of the class Chlorophyceae): 4 g

Fiber (product name: Oji Fiber, manufactured by Tomakomai Oji Paper Co., Ltd.): 60 g Chemical fertilizer (product name: Green Hosca (fine grain), manufactured by JCAM Agri Co., Ltd.): 100 g Example 2

Dry live algae powder (the genus Klebsormidium of the class Chlorophyceae): 4 g

Fiber (product name: Oji Fiber, manufactured by Tomakomai Oji Paper Co., Ltd.): 60 g Chemical fertilizer (product name: Green Hosca (fine grain), manufactured by JCAM Agri Co., Ltd.): 100 g Killed algae product (the family Chlorellaceae of the class Chlorophyceae): 1 g γ-Polyglutamic acid (product name: *Bacillus* natto gum, manufactured by VEDAN Enterprise Corporation): 9 g Comparative Example 1

Fiber (product name: Oji Fiber, manufactured by Tomakomai Oji Paper Co., Ltd.): 60 g Chemical fertilizer (product name: Green Hosca (fine grain), manufactured by JCAM Agri Co., Ltd.): 100 g (Method for Preparing Dry Live Algae Powder)

First, the target algae (Klebsormidium of the class Chlorophyceae) selected under a microscope were cultured using a BBM medium in a flask for 10 days. The cultured algae were separated into solid and liquid by a centrifuge, and the collected paste-like solid was dried in the sun to obtain dry live algae powder.

(Method for Preparing Killed Algae Product)

First, the target algae (the family Chlorellaceae of the class Chlorophyceae) selected under a microscope were cultured using a BBM medium in a flask for 10 days. The cultured algae were separated into solid and liquid by a centrifuge, and the collected paste-like solid was spray-dried at 100° C., whereby a killed algae product was obtained.

(Adjustment of Test Environment)

Figure 1:
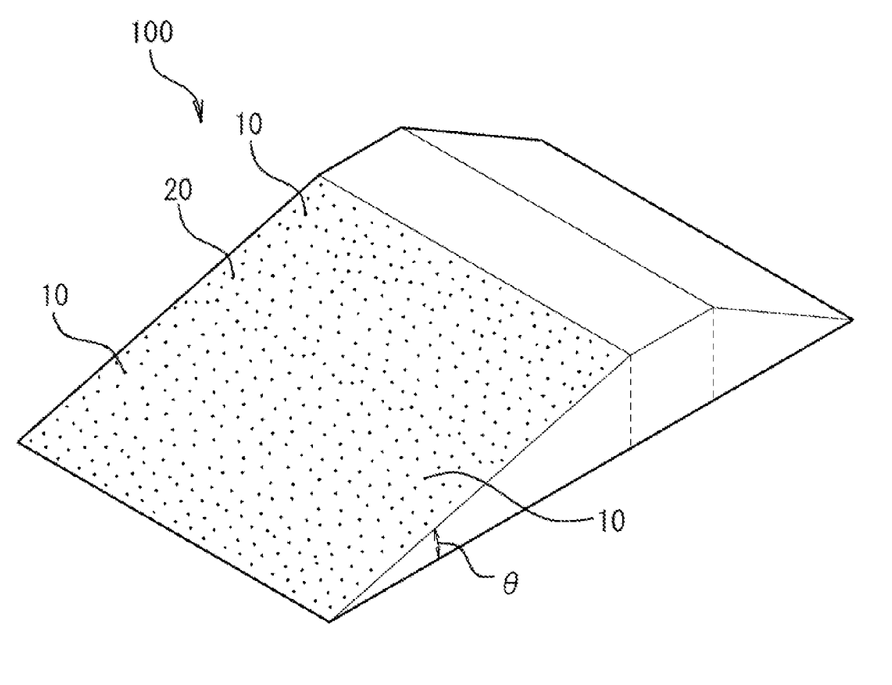
FIG. 1 is a schematic diagram schematically showing one hill (experimental plot) as a test environment.

The test environment was adjusted as follows. That is, commercially available Akadama (red ball) soil and black soil were mixed at a ratio of 1:1 to prepare a mixed soil. Then, on an outdoor sunny flat land in Gifu Prefecture, six substantially trapezoidal hills with an inclined surface with an inclination angle of 15 degrees were created in parallel using the above mixed soil. Then, using square timber and string thread, one square region with each side of 1 m was secured on each inclined surface. FIG. 1 schematically shows a test environment 100. FIG. 1 is a schematic view schematically showing one of the hills (experimental plots), which is the test environment 100, and the square timber and the string thread are not shown. The test environment 100, which is one experimental plot, has a square inclined surface 20 having an inclination angle θ=15 degrees and a size of 1 m×1 m. As will be described later, a spraying material 10 is sprayed on the inclined surface 20.

(Natural Invasion Promoting Test and Observation)

Using the spraying materials of the above-described Examples and Comparative Example, the natural invasion promoting effect test was conducted as follows. The test was conducted in two experimental plots (n=2) for each spraying material.

Each spraying material (spraying material 10) was suspended in 2 L of water, and sprayed by hand on the square region (inclined surface 20) substantially evenly. The amount of the spraying material sprayed was adjusted so that the amount of live algae (dry weight) was 4 $g/m^2$.

The test started on Oct. 1, 2018. The total rainfall during the period of time from Oct. 1, 2018 to Nov. 15, 2018 was 87.5 mm, and the maximum daily rainfall was 28 mm on Oct. 6, 2018.

On Day 12 after spraying, the soil surface was observed by the following method.

In the experimental plots of each of the Examples and the Comparative Example, five spots (10 cm×10 cm rectangular region) were randomly selected for each experimental plot as observation regions. Then, each observation region was observed by macro photography to observe the growth state of algae. As a result, in Example 1, it was confirmed that algae partially bred in all the observation regions. On the other hand, in Example 2, the breeding of algae was confirmed almost entirely in all the observation regions. In Comparative Example 1, no breeding of algae was confirmed in any of the observation regions.

From the above observation results, it was confirmed that algae bred in a short period of time after spraying in all of the Examples. In addition, it was confirmed that, in Example 2 including the killed algae product, algae remarkably actively grew as compared with Example 1.

In addition, the numbers of germinated plants on Days 0, 31 and 46 were counted in the experimental plots of each of the Examples and the Comparative Example. The results are shown in Table 1.

As shown in Table 1, significantly higher numbers of germinated plants were confirmed in all the Examples than in the Comparative Example. In Example 2 including the killed algae product, the numbers of germinated plants were significantly higher on both Days 31 and 46 than in Example 1.

TABLE 1

|  | Experimental plot | Number of germinated plants immediately after spraying | Number of germinated plants on Day 31 after spraying | Number of germinated plants on Day 46 after spraying |
| --- | --- | --- | --- | --- |
| Example 1 | 1 | 0 Plants | 48 Plants | 67 Plants |
|  | 2 | 0 Plants | 56 Plants | 71 Plants |
| Example 2 | 1 | 0 Plants | 78 Plants | 88 Plants |
|  | 2 | 0 Plants | 65 Plants | 83 Plants |
| Comparative Example 1 | 1 | 0 Plants | 18 Plants | 27 Plants |
|  | 2 | 0 Plants | 11 Plants | 22 Plants |

The above embodiment encompasses the following technical ideas.

(1) A natural invasion promoting method including:

spraying a spraying material including live algae on a soil surface;

breeding the live algae; and also directly or indirectly catching flying seeds or spores by a tacky substance secreted on surfaces of the live algae or a catching structure composed of the live algae to promote greening on the soil surface.

(2) The natural invasion promoting method according to (1), in which an amount of the live algae sprayed is 30 g/m² or less based on the dry weight of the live algae.

(3) The natural invasion promoting method according to (1) or (2), in which the spraying material includes a killed algae product made of killed algae.

(4) The natural invasion promoting method according to (3), in which the killed algae product obtained by killing treatment includes a protein and at least one selected from the group consisting of carbohydrate, lipid and ash.

(5) The natural invasion promoting method according to any one of (1) to (4), in which the spraying material includes a tackifier.

(6) A spraying material that is used in the natural invasion promoting method according to any one of (1) to (5), the spraying material including live algae.

REFERENCE SIGNS LIST

10 Spraying material
20 Inclined surface
100 Test environment
θ Inclination angle

The invention claimed is:

1. A natural invasion promoting method comprising:
spraying a spraying material comprising live algae on a soil surface, wherein the live algae has been dried at a temperature of 60° C. or less and pulverized, and an amount of the live algae sprayed is 30 g/m² or less based on the dry weight of the live algae;
breeding the live algae; and also
catching flying seeds or spores by a tacky substance secreted on surfaces of the live algae or by a catching structure composed of the live algae to promote greening on the soil surface, wherein the catching structure is a three-dimensional catching network structure formed by entwining the live algae grown in a filamentous shape or an uneven structure composed of the live algae randomly overlapping with each other.

2. The natural invasion promoting method according to claim 1, wherein the spraying material further comprises a killed algae product made of killed algae, together with the live algae.

3. The natural invasion promoting method according to claim 2, wherein the killed algae product is obtained by a killing treatment and comprises a protein and at least one selected from the group consisting of carbohydrate, lipid and ash.

4. The natural invasion promoting method according to claim 1, wherein the spraying material further comprises a tackifier.

5. A spraying material that is used in the natural invasion promoting method according to claim 1, the spraying material comprising the live algae that has been dried at a temperature of 60° C. or less and pulverized.

6. The natural invasion promoting method according to claim 1, wherein in the catching step, the flying seeds or spores naturally flow onto the soil and are caught by the tacky substance or by the three-dimensional catching network structure.

* * * * *